(12) United States Patent
Wu

(10) Patent No.: US 7,631,818 B2
(45) Date of Patent: Dec. 15, 2009

(54) PORTABLE DIRECT-CURRENT SPRAYER

(76) Inventor: Scott Wu, No. 6, Lane 176, Wu Fu Road, Taichung Hsien, Wu Feng Hsiang (TW)

( * ) Notice: Subject to any disclaimer, the term of this patent is extended or adjusted under 35 U.S.C. 154(b) by 498 days.

(21) Appl. No.: 11/163,325

(22) Filed: Oct. 14, 2005

(65) Prior Publication Data

US 2006/0027681 A1 Feb. 9, 2006

Related U.S. Application Data

(63) Continuation-in-part of application No. 10/913,646, filed on Aug. 6, 2004, now abandoned.

(51) Int. Cl.
*B05B 9/03* (2006.01)

(52) U.S. Cl. ............... 239/302; 239/325; 239/332; 239/333; 239/337

(58) Field of Classification Search ......... 239/231–334, 239/543, 146, 337, 349, 360, 380; 222/333
See application file for complete search history.

(56) References Cited

U.S. PATENT DOCUMENTS

| | | | |
|---|---|---|---|
| 3,904,116 A * | 9/1975 | Jones et al. | 239/127 |
| 4,925,105 A * | 5/1990 | Lin | 239/154 |
| 5,100,058 A | 3/1992 | Wei | 239/273 |
| 5,263,223 A * | 11/1993 | Fiegel et al. | 15/321 |
| 5,716,007 A * | 2/1998 | Nottingham et al. | 239/332 |
| 5,823,402 A | 10/1998 | Moyer et al. | 222/383.1 |
| 5,890,258 A * | 4/1999 | Lee | 15/320 |
| 6,094,773 A * | 8/2000 | Krentz et al. | 15/321 |
| 6,158,669 A * | 12/2000 | Louis | 239/146 |
| 6,651,907 B2 | 11/2003 | Rodd | 239/332 |
| 7,182,280 B2 * | 2/2007 | Ye et al. | 239/526 |
| 2003/0094511 A1 | 5/2003 | Rodd | 239/332 |
| 2005/0006400 A1 * | 1/2005 | Shapanus et al. | 222/1 |

OTHER PUBLICATIONS

Taiwanese Patent Publication Serial No. 463749, Nov. 11, 2001, 4 pages.
German Patent Publication No. DE 19630179 C1, Dec. 18, 1997, 4 pages.
German Utility Model Publication No. DE 9204248 U1, Jun. 11, 1992, 7 pages.

* cited by examiner

*Primary Examiner*—Len Tran
*Assistant Examiner*—Jason J Boeckmann
(74) *Attorney, Agent, or Firm*—Alan Kamrath; Kamrath & Associates PA (57) ABSTRACT

A portable direct-circuit sprayer includes a body, a platform, a pump and a control panel. The body includes a water chamber therein, a component chamber therein and two longitudinal shoulders on the interior of the component chamber. The platform is supported on the longitudinal shoulders in a cushioning manner. The pump is installed on the platform. The control panel is installed on the body in order to enclose the platform in the component chamber.

7 Claims, 7 Drawing Sheets

PORTABLE DIRECT-CURRENT SPRAYER

BACKGROUND OF INVENTION

1. Field of Invention

The present invention relates to a sprayer and, more particularly, to a portable direct-current sprayer.

2. Related Prior Art

In U.S. Pat. No. 6,158,669, there is disclosed a portable misting device 100 including a housing 102 and a compartment 119 put in the housing 102. The compartment 119 is shut by a sidewall 137. A bracket 123 is secured to the sidewall 137 by screws. A battery 128 is put on the bracket 123. A filter 110 and a pump 114 are attached to a side of the bracket 123 while an accumulator 116 is attached to an opposite side of the bracket 123. A hose 108 is inserted through an orifice 141 defined in the sidewall 137. A switch 131 is put in an orifice 143 defined in the sidewall 137. A switch 170 is put in an orifice 145 defined in the sidewall 137. The misting device 100 can be used in various occasions.

Several problems have been encountered in the use of the portable misting device 100. For maintenance or repair, the sidewall 137 must be moved from the housing 102. However, carrying the filter 110, the pump 114 and the accumulator 116, the sidewall 137 is heavy, and it is hard to handle the sidewall 137. Moreover, the pump 114 vibrates in operation. The vibration causes the sidewall 137 and the housing 102 to rub against each other. After some time of use, the sidewall 137 cannot be attached to the housing 102 firmly. The lifecycle of the portable misting devices 100 is short.

The present invention is therefore intended to obviate or at least alleviate the problems encountered in the prior art.

SUMMARY OF INVENTION

According to the present invention, a portable direct-circuit sprayer includes a body, a platform, a pump and a control panel. The body includes a water chamber therein, a component chamber therein and two longitudinal shoulders on the interior of the component chamber. The platform is supported on the longitudinal shoulders in a cushioning manner. The pump is installed on the platform. The control panel is installed on the body in order to enclose the platform in the component chamber.

An advantage of the sprayer according to the present invention is its low cost. This is because it is made with a simple structure consisting of only a few elements involving easy fabrication.

Another advantage of the sprayer according to the present invention is its easy maintenance and repair. This is because the movement of the control panel from the body is easy since the control panel is not connected to the pump or any other heavy components.

Still another advantage of the sprayer according to the present invention is its long lifecycle. This is because it is not vulnerable to vibration that the pump entails in operation, since the body holds the platform firmly and absorbs the vibration.

Firstly, it is made with a simple structure consisting of only a few elements involving easy fabrication and, hence, a low cost.

Secondly, its maintenance and repair are easy because the movement of the control panel 30 from the body 10 is easy since the control panel 30 is not connected to the pump 20 or any other heavy components.

Thirdly, its lifecycle is long with the portable direct-current sprayer not being vulnerable to vibration as the body 10 holds the platform 25 firmly and absorbs the vibration that the pump 20 entails in operation.

Other objectives, advantages and novel features of the present invention will become more apparent from the following detailed description referring to the attached drawings.

BRIEF DESCRIPTION OF DRAWINGS

The present invention will be described via detailed illustration of the preferred embodiment referring to the drawings.

DETAILED DESCRIPTION OF INVENTION

Figure 1:
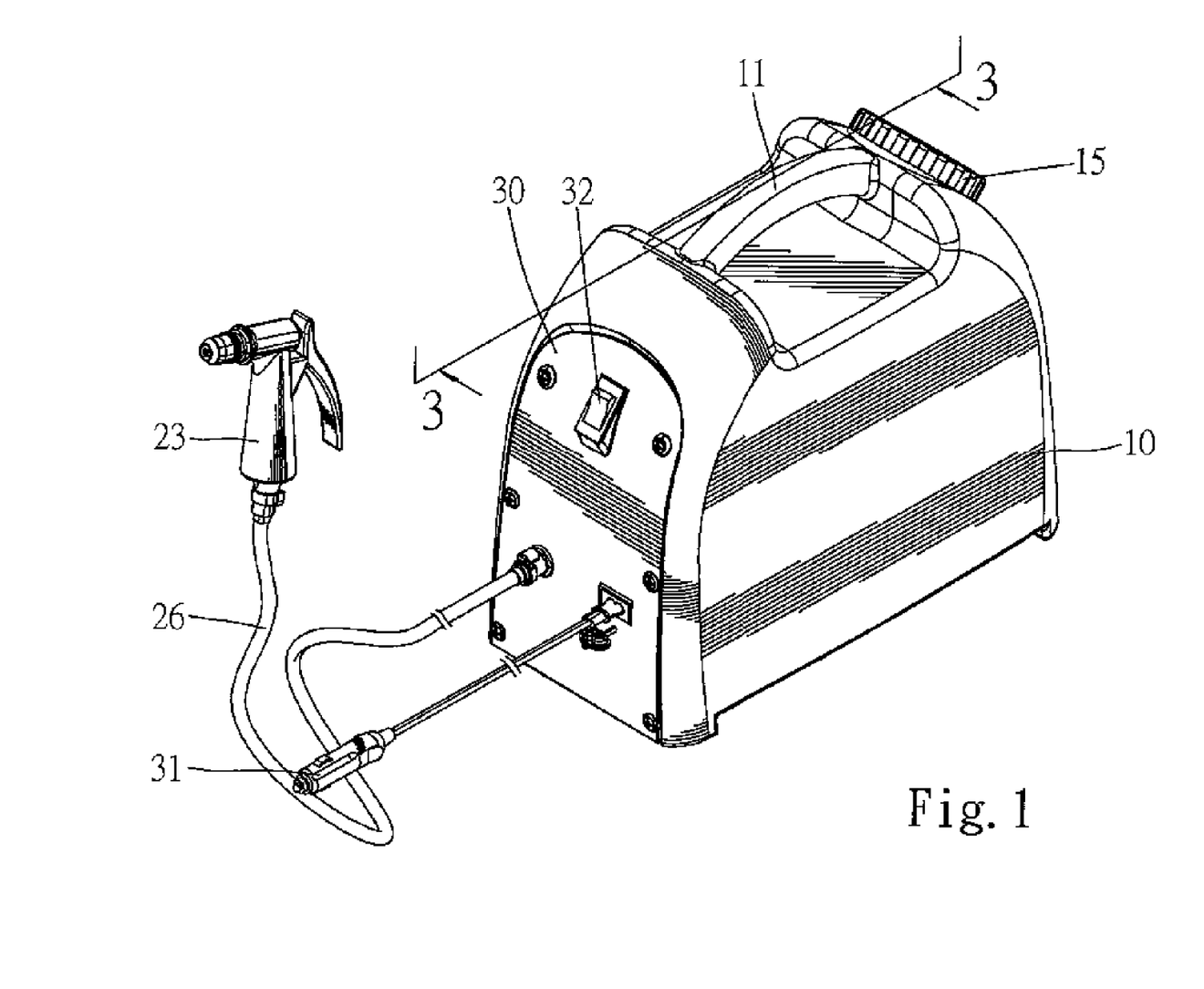
FIG. 1 is a perspective view of a portable direct-current sprayer according to the preferred embodiment of the present invention.
Figure 2:
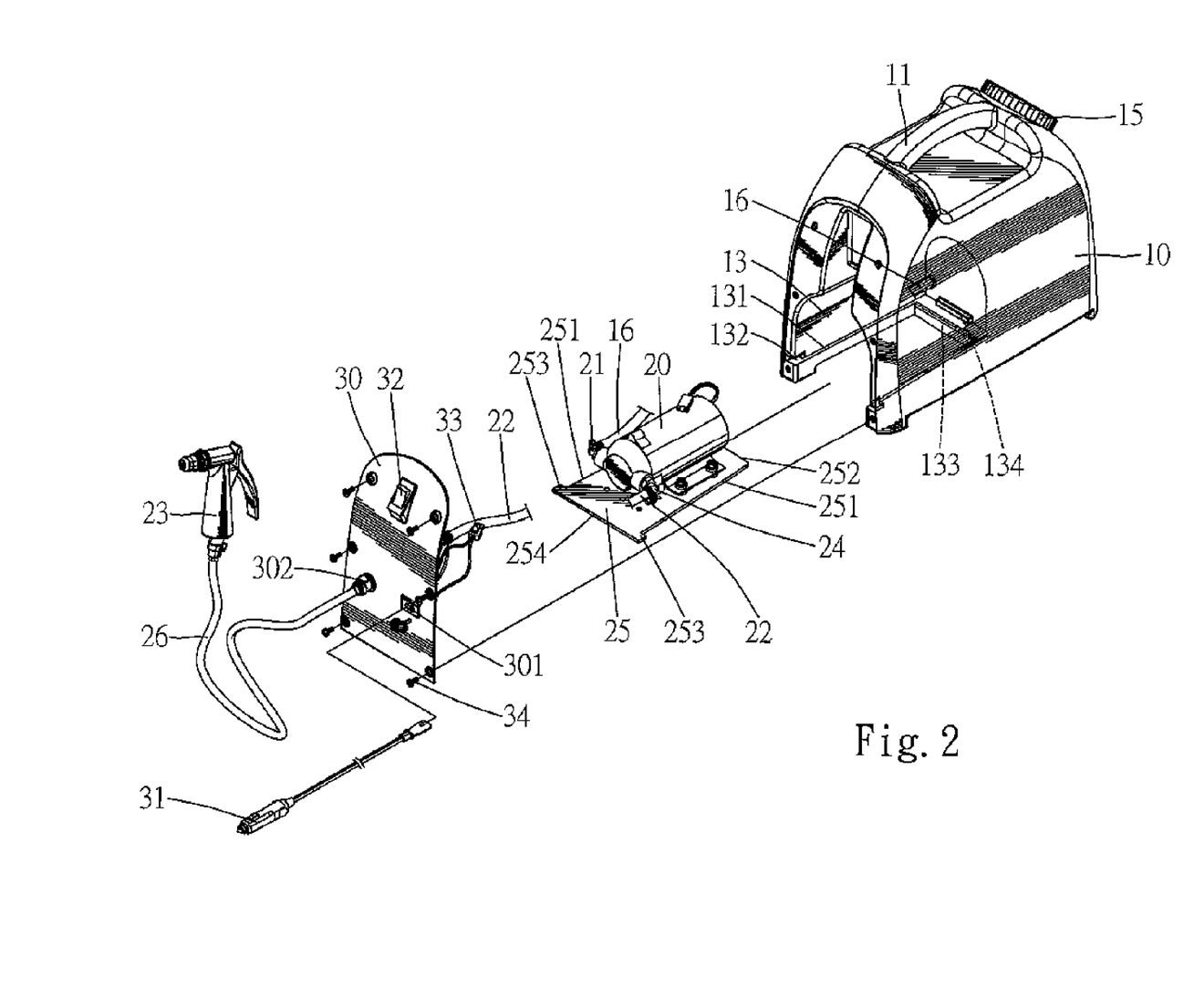
FIG. 2 is an exploded view of the sprayer shown in FIG. 1.
Figure 3:
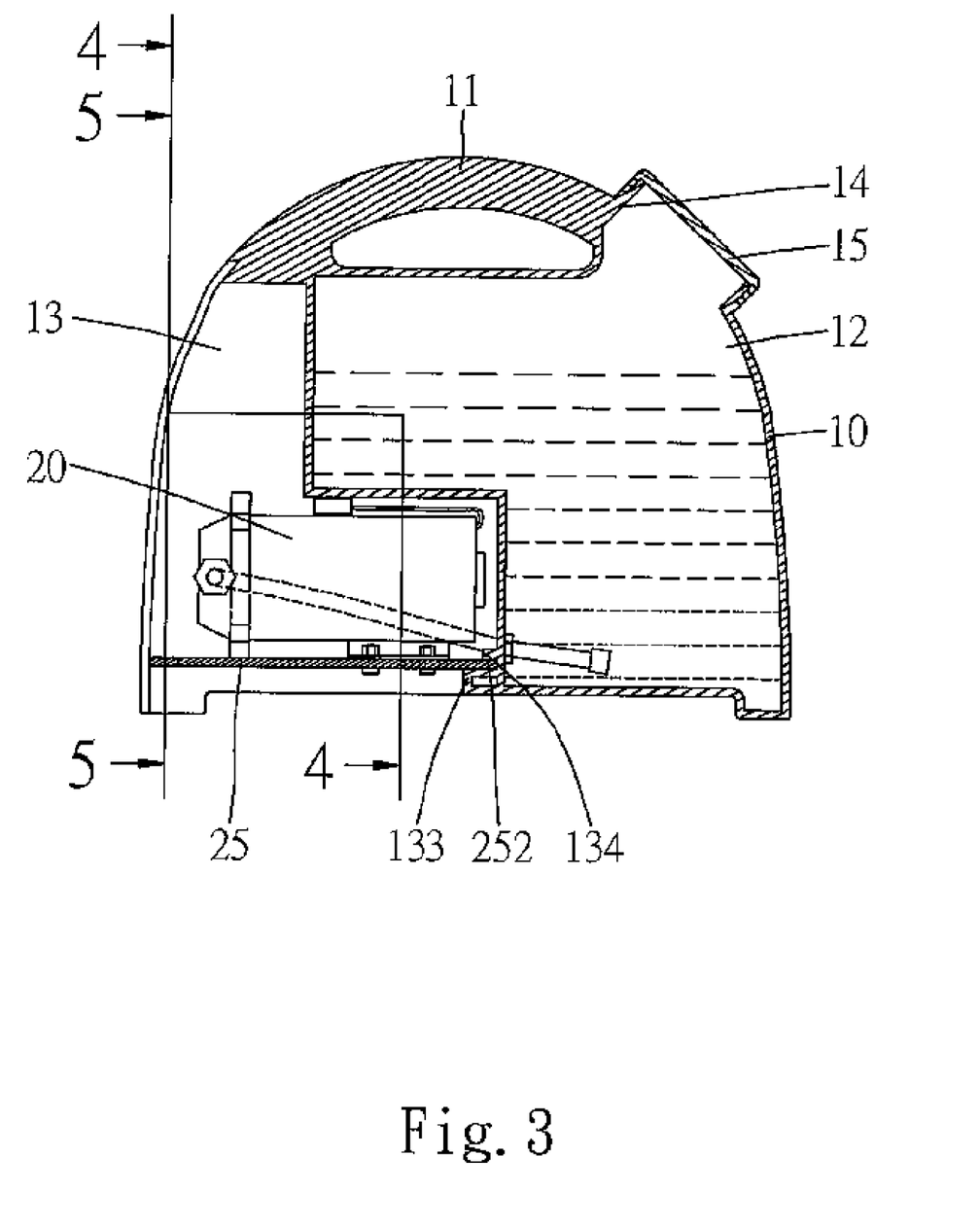
FIG. 3 is a cross-sectional view taken along a line 3-3 in FIG. 1.

Referring to FIGS. 1 through 3, there is shown a portable direct-current sprayer in accordance with the preferred embodiment of the present invention. The sprayer includes a body 10, a pump 20 and a control panel 30.

The body 10 includes a handle 11 formed thereon so that a user can carry the body 10 by the handle 11. The body 10 defines a water chamber 12. The water camber 12 includes an opening 14. Water can be poured into the water chamber 12 through the opening 14. The opening 14 can be shut by a cover 15 so that the water can be restored in the water chamber 12. The body 10 defines a component chamber 13. The component chamber 13 is separated from the water chamber 12 except that an upstream pipe 16 is directed to the component chamber 13 from the water chamber 12. The water can be transmitted to the component chamber 13 from the water chamber 12 through the upstream pipe 16. A transverse shoulder 133 and two longitudinal shoulders 131 are formed on the interior of the component chamber 13. The shoulders 131 and 133 are integrated. A ridge 134 is also formed on the interior of the component chamber 13 above the transverse shoulder 133. In the front surface of the body 10 are defined two recesses 132, with each recess 132 being near one of the longitudinal shoulders 131.

The pump 20 includes an inlet 21 and an outlet 24. The inlet 21 is connected to the upstream pipe 16. The outlet 24 is connected to a downstream pipe 22 directed to the control panel 30. The pump 20 is powered by direct current, not alternate current.

The pump 20 is attached to a platform 25. The platform 25 includes a rear edge 252, a front edge 254, two longitudinal edges 251 and two tabs 253 each extended from one of the longitudinal edges 251 near the front edge 254. The platform 20 is put in the component chamber 13. The rear edge 252 is put between and clipped by the transverse shoulder 133 and the ridge 134. The longitudinal edges 251 are put on the longitudinal shoulders 131. The tabs 253 are put in the recesses 132.

On the control panel 30 is installed a socket 301. In the component chamber 13, a relay 33 is provided between the socket 301 and the pump 20. Outside the component chamber 13, the socket 301 can receive a first end of a connector 31. The joint 302 includes an end connected to the downstream pipe 22 and an opposite end for connection to a hose 26 directed to a nozzle 23. The control panel 30 is attached to the front surface of the body 10 by screws 34. The pump 20 is kept in the component chamber 13.

Figure 4:
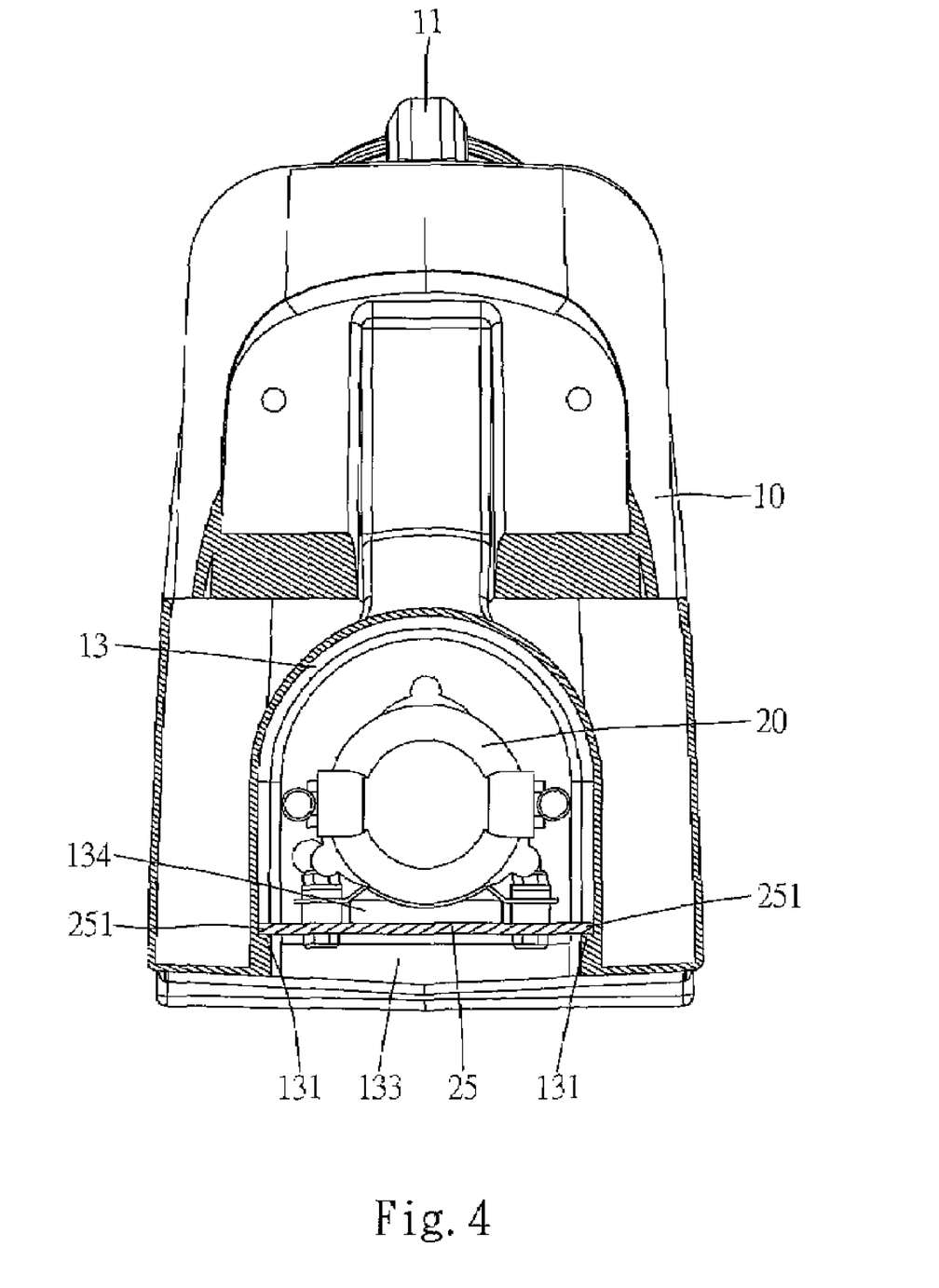
FIG. 4 is a cross-sectional view taken along a line 4-4 in FIG. 3.
Figure 5:
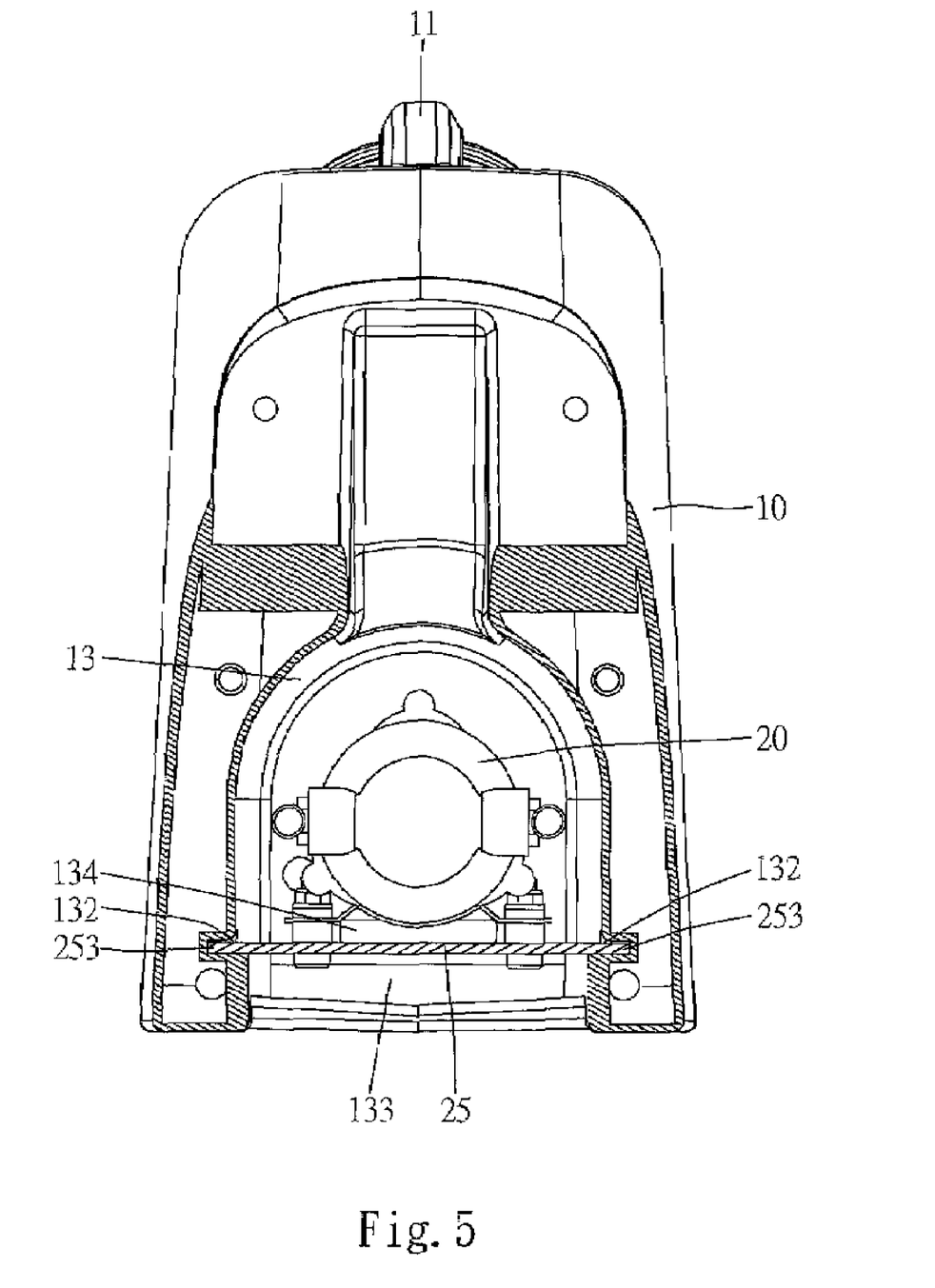
FIG. 5 is a cross-sectional view taken along a line 5-5 in FIG. 3.

Referring to FIGS. 3 through 5, the platform 20 is kept in the component chamber 13 by the control panel 30. The rear edge 252 is clipped by the transverse shoulder 133 and the ridge 134. The longitudinal edges 251 are put on the longitudinal shoulders 131. The tabs 253 are put in the recesses 132. Thus, the body 10 can absorb vibration that the pump 20 entails in operation. The lifecycle of the sprayer is long.

Figure 6:
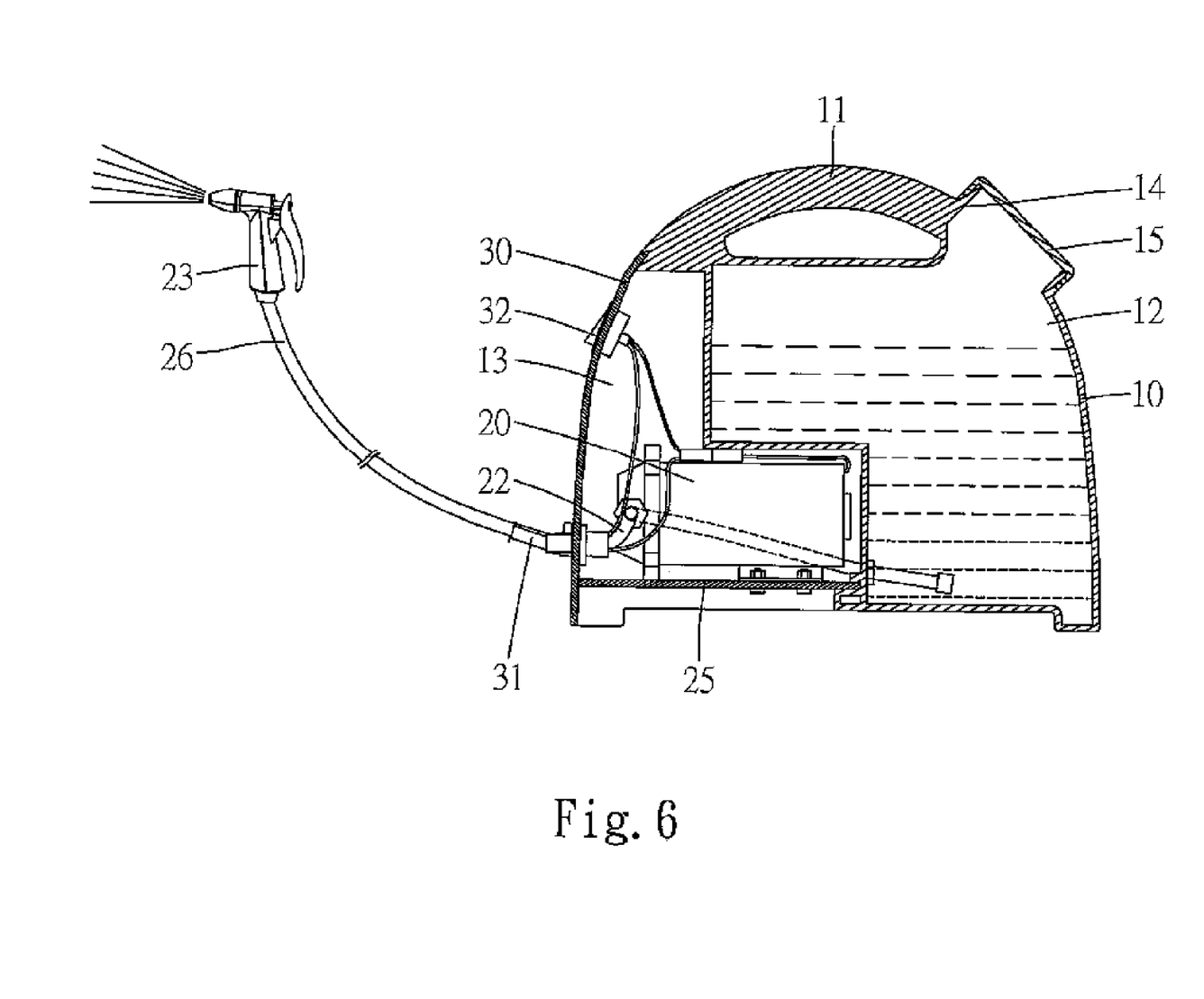
FIG. 6 is similar to FIG. 3 but shows a nozzle connected, through a hose, to a body of the sprayer.
Figure 7:
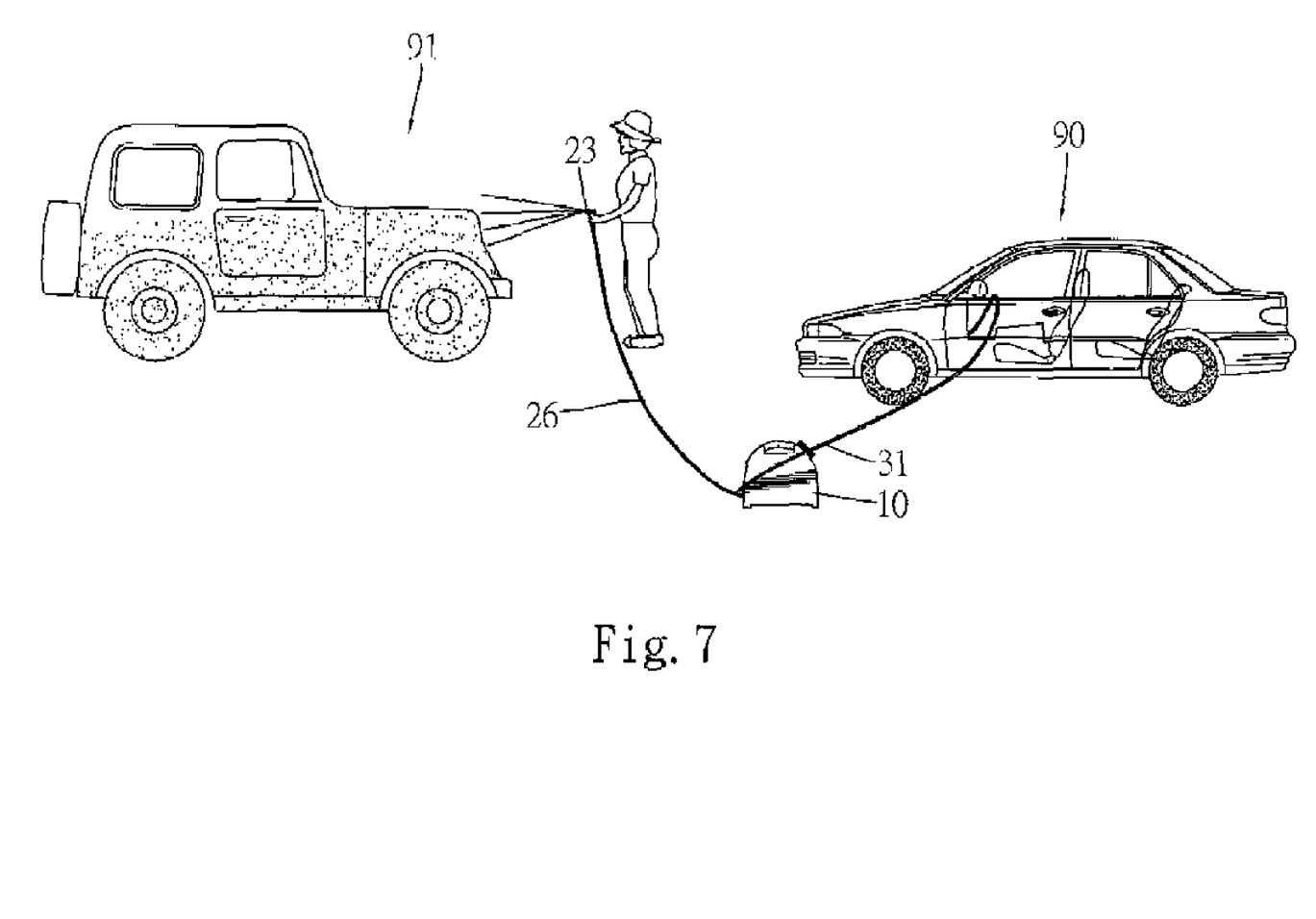
FIG. 7 is a side view of a user washing a jeep by the sprayer shown in FIG. 1 electrically connected to a sedan

Referring to FIGS. 6 and 7, on the control panel 30 is installed a switch 32. In the component chamber 13, the switch 32 is electrically connected to the socket 301. A second end of the connector 31 is inserted in a socket (not shown) designed for receiving a cigarette lighter in a vehicle. Then, the user can operate the switch 32 in order to turn on the sprayer. Hence, the user can spray the water from the nozzle 23.

As shown, the user inserts the second end of the connector 31 in a socket designed for receiving a cigarette lighter in a sedan 90 and washes a jeep 91 with the water from the nozzle 23.

Although not shown, the user can wash the sedan 90 with the water from the nozzle 23.

Although not shown, the user can insert the second end of the connector 31 in a socket designed for receiving a cigarette lighter in the jeep 91, and wash the sedan 90 with the water from the nozzle 23.

The sprayer of the present invention exhibits several advantages.

Firstly, its cost is low. This is because of its simple structure consisting of only a few elements that involve easy fabrication.

Secondly, its maintenance and repair are easy, because the movement of the control panel 30 from the body 10 is easy since the control panel 30 is not connected to the pump 20 or any other heavy components.

Thirdly, its lifecycle is long with the sprayer not being vulnerable to the vibration since the body 10 holds the platform 25 firmly and absorbs the vibration.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A portable direct-circuit sprayer comprising:
a water chamber defining a component chamber having an interior therein, and with the water chamber including two, longitudinal, laterally spaced shoulders in the interior of the component chamber;
a platform including a rear edge, a front edge, and two, laterally spaced, longitudinal edges extending between the rear edge and the front edge, with the two, laterally spaced, longitudinal edges longitudinally slideable on the two, longitudinal, laterally spaced shoulders with the platform supported on and between the two, longitudinal, laterally spaced shoulders and in the interior of the component chamber;
a pump installed on the platform in the interior of the component chamber, with the platform being intermediate the two, longitudinal, laterally spaced shoulders and the pump; and
a control panel separately formed from the platform, with the control panel installed on the water chamber, with the control panel abutting with the platform and enclosing the platform in the component chamber with the platform sandwiched in the component chamber by the control panel and being prevented from moving outwardly of the interior of the component chamber due to abutment against the two, longitudinal, laterally spaced shoulders,
wherein the water chamber defines two recesses in a front surface parallel to the two longitudinal, laterally spaced shoulders, wherein the platform comprises two tabs formed on and laterally outwardly of the two, laterally spaced, longitudinal edges and including the front edge, with the two tabs longitudinally slideable in the two recesses, with the two tabs enclosed in the two recesses by the control panel with the front edge of the two tabs abutting with the control panel laterally outwardly of the front edge of the platform.

2. A portable direct-circuit sprayer comprising:
a water chamber defining a component chamber having an interior therein, and with the water chamber including two, longitudinal, laterally spaced shoulders in the interior of the component chamber;
a platform including a rear edge, a front edge, and two, laterally spaced, longitudinal edges extending between the rear edge and the front edge, with the two, laterally spaced, longitudinal edges longitudinally slideable on the two, longitudinal laterally spaced shoulders with the platform supported on and between the two, longitudinal, laterally spaced shoulders and in the interior of the component chamber;
a pump installed on the platform in the interior of the component chamber, with the platform being intermediate the two, longitudinal, laterally spaced shoulders and the pump; and
a control panel separately formed from the platform, with the control panel installed on the water chamber, with the control panel abutting with the platform and enclosing the platform in the component chamber with the platform sandwiched in the component chamber by the control panel and being prevented from moving outwardly of the interior of the component chamber due to abutment against the two, longitudinal, laterally spaced shoulders,
wherein the water chamber comprises a transverse shoulder in the interior of the component chamber and extending between the two, longitudinal, laterally spaced shoulders, with the rear edge of the platform supported on the transverse shoulder and in the interior of the component chamber,
wherein the water chamber defines two recesses in a front surface parallel to the two, longitudinal, laterally spaced shoulders, wherein the platform comprises two tabs formed on and laterally outwardly of the two, laterally spaced, longitudinal edges and including the front edge, with the two tabs longitudinally slideable in the two recesses, with the two tabs enclosed in the two recesses by the control panel with the front edge of the two tabs abutting with the control panel laterally outwardly of the front edge of the platform.

3. A portable direct-circuit sprayer comprising:
a water chamber defining a component chamber having an interior therein, and with the water chamber including two, longitudinal, laterally spaced shoulders in the interior of the component chamber;
a platform including a rear edge, a front edge, and two, laterally spaced, longitudinal edges extending between the rear edge and the front edge, with the two, laterally spaced, longitudinal edges longitudinally slideable on the two, longitudinal, laterally spaced shoulders with the platform supported on and between the two, longitudinal, laterally spaced shoulders and in the interior of the component chamber;

a pump installed on the platform in the interior of the component chamber, with the platform being intermediate the two, longitudinal, laterally spaced shoulders and the pump; and a control panel separately formed from the platform, with the control panel installed on the water chamber, with the control panel abutting with the platform and enclosing the platform in the component chamber with the platform sandwiched in the component chamber by the control panel and being prevented from moving outwardly of the interior of the component chamber due to abutment against the two, longitudinal, laterally spaced shoulders, wherein the water chamber comprises a transverse shoulder in the interior of the component chamber and extending between the two, longitudinal, laterally spaced shoulders, with the rear edge of the platform supported on the transverse shoulder and in the interior of the component chamber, wherein the water chamber comprises a ridge above the transverse shoulder and in the interior of the component chamber, with the platform being intermediate the ridge and the transverse shoulder so that the ridge and the transverse shoulder clips the rear edge of the platform slideably received therebetween.

4. The sprayer according to claim 3 wherein the water chamber defines two recesses in a front surface parallel to the two, longitudinal, laterally spaced shoulders, wherein the platform comprises two tabs formed on and laterally outwardly of the two, laterally spaced, longitudinal edges and including the front edge, with the two tabs longitudinally slideable in the two recesses, with the two tabs enclosed in the two recesses by the control panel with the front edge of the two tabs abutting with the control panel laterally outwardly of the front edge of the platform.

5. The sprayer according to claim 1 wherein the water chamber further comprises a handle thereon so that a user can hold the water chamber by the handle.

6. The sprayer according to claim 1 further comprising a nozzle in communication with the pump.

7. The sprayer according to claim 1 further comprising a plurality of screws for attaching the control panel to the water chamber.

* * * * *